US011768519B2

(12) United States Patent
Feng

(10) Patent No.: US 11,768,519 B2
(45) Date of Patent: Sep. 26, 2023

(54) FLEXIBLE DISPLAY DEVICE

(71) Applicant: WUHAN CHINA STAR OPTOELECTRONICS SEMICONDUCTOR DISPLAY TECHNOLOGY CO., LTD., Wuhan (CN)

(72) Inventor: Zikang Feng, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 563 days.

(21) Appl. No.: 16/961,123

(22) PCT Filed: Jun. 19, 2020

(86) PCT No.: PCT/CN2020/096978
§ 371 (c)(1),
(2) Date: Jul. 9, 2020

(87) PCT Pub. No.: WO2021/237831
PCT Pub. Date: Dec. 2, 2021

(65) Prior Publication Data
US 2023/0095247 A1    Mar. 30, 2023

(30) Foreign Application Priority Data
May 26, 2020 (CN) .......................... 202010456699.8

(51) Int. Cl.
*G06F 1/16* (2006.01)
*G09F 9/30* (2006.01)
(Continued)

(52) U.S. Cl.
CPC .......... *G06F 1/1652* (2013.01); *G06F 1/1624* (2013.01); *G06F 3/041* (2013.01); *G09F 9/301* (2013.01); *H04M 1/0268* (2013.01)

(58) Field of Classification Search
CPC combination set(s) only.
See application file for complete search history.

(56) References Cited

U.S. PATENT DOCUMENTS 8,711,566 B2 *   4/2014   O'Brien ................ G06F 1/1652
                                                           361/724
9,195,272 B2 *  11/2015   O'Brien .............. H04M 1/0268
(Continued)

FOREIGN PATENT DOCUMENTS

CN      106601129 A     4/2017
CN      106847103 A     6/2017
(Continued)

OTHER PUBLICATIONS

International Search Report in International application No. PCT/CN2020/096978, dated Mar. 2, 2021.
(Continued)

*Primary Examiner* — Lisa Lea-Edmonds
(74) *Attorney, Agent, or Firm* — PV IP PC; Zhigang Ma; Wei Te Chung

(57) ABSTRACT

A flexible display device is provided. A first support member is fixedly disposed with a housing, and a second support member is slidably disposed relative to the first support member. One end of the flexible display screen is connected to one end of the second support member, and the other end of the flexible display screen is connected to a winding mechanism within the housing. A first hard layer between the first support member and the flexible display screen is fixed to one side of the first support member, and a second hard layer between the first hard layer and the flexible (Continued)

display screen is fixed to one side of the second support member.

20 Claims, 10 Drawing Sheets

(51) Int. Cl.
  *G06F 3/041* (2006.01)
  *H04M 1/02* (2006.01)

(56) References Cited

U.S. PATENT DOCUMENTS

| | | | | |
|---|---|---|---|---|
| 10,082,833 | B2* | 9/2018 | Chen | G06F 1/1652 |
| 10,164,208 | B2* | 12/2018 | Lee | B32B 5/145 |
| 10,602,623 | B1 | 3/2020 | Myers | |
| 10,879,499 | B2* | 12/2020 | Tang | H10K 71/00 |
| 11,235,554 | B2* | 2/2022 | Park | B32B 27/306 |
| 11,314,285 | B2* | 4/2022 | Feng | G06F 1/1652 |
| 11,315,447 | B2* | 4/2022 | Feng | G06F 1/1652 |
| 11,576,268 | B2* | 2/2023 | Park | B32B 37/12 |
| 11,577,492 | B2* | 2/2023 | Woody, V | G06F 1/1613 |
| 2018/0014417 | A1* | 1/2018 | Seo | H05K 1/189 |
| 2020/0348727 | A1* | 11/2020 | Lee | G06F 1/1624 |
| 2021/0120111 | A1* | 4/2021 | Choi | H04M 1/0268 |

FOREIGN PATENT DOCUMENTS

| | | |
|---|---|---|
| CN | 110491289 A | 11/2019 |
| CN | 210274154 U | 4/2020 |
| CN | 210274156 U | 4/2020 |
| CN | 210443169 U | 5/2020 |

OTHER PUBLICATIONS

Written Opinion of the International Search Authority in International application No. PCT/CN2020/096978, dated Mar. 2, 2021.

* cited by examiner a b a b

FLEXIBLE DISPLAY DEVICE

BACKGROUND OF INVENTION

Field of Invention

The present disclosure relates to the technical field of display technology, and more particularly, to a flexible display device.

Description of Prior Art

At present, most of the flexible display devices achieve large-screen and small-screen display of a flexible display screen by use of two relatively slidable housings. Each of the support plates is respectively disposed in the two housings to support the flexible display screen. However, the two support plates are mostly nested with each other to achieve relative sliding, so that the support surfaces of the two support plates are non-planar, but uneven. When the user touches the flexible display screen, a touch gap feeling will be existed, which affects the touch effect.

Therefore, the conventional flexible display device has a technical problem of generating a touch gap feeling when the flexible display screen is touched, which is needed to be improved.

Technical Problem

The embodiments of the present disclosure provide a flexible display device, which is used to alleviate the technical problem of generating a touch gap feeling when a flexible display screen is touched in the conventional flexible display device.

SUMMARY OF INVENTION

To solve the problem described above, a technical solution provided by the present disclosure is as follows.

A flexible display device comprises:

a housing disposed with a winding mechanism, a first support member fixedly disposed with the housing, and a second support member slidably disposed with the first support member;

a flexible display screen laid on one side of the first support member and the second support member, wherein a first end of the flexible display screen is connected to one end of the second support member away from the first support member, and a second end of the flexible display screen is connected to the winding mechanism; and a hard layer comprising a first hard layer disposed between the first support member and the flexible display screen, and a second hard layer disposed between the first hard layer and the flexible display screen, wherein one side of the first hard layer away from the flexible display screen is fixedly connected to one side of the first support member, and one side of the second hard layer away from the flexible display screen is fixedly connected to one side of the second support member.

In the flexible display device of the present disclosure, at least one portion of the first hard layer overlaps at least one portion of the second hard layer.

In the flexible display device of the present disclosure, a thickness of the first hard layer and the second hard layer are both from 0.01 mm to 0.5 mm.

In the flexible display device of the present disclosure, a modulus of the first hard layer and the second hard layer are both from 5000 MPa to 500000 MPa.

In the flexible display device of the present disclosure, one side of the first hard layer away from the flexible display screen is adhered to one side of the first support member through a first adhesive layer. One side of the second hard layer close to the flexible display screen is adhered to one side of the flexible display screen through a second adhesive layer. One side of the second hard layer away from the flexible display screen partially adhered to one side of the second support member through a third adhesive layer.

In the flexible display device of the present disclosure, an area of the first hard layer is greater than an area of the first support member, and an area of the second hard layer is greater than an area of the second support member.

In the flexible display device of the present disclosure, a compensation layer is further disposed on one side of the flexible display screen close to the first support member, and a thickness of the compensation layer is less than or equal to the thickness of the first hard layer.

In the flexible display device of the present disclosure, the compensation layer is integrally formed with the flexible display screen.

In the flexible display device of the present disclosure, one end of the compensation layer is adjacent to one end of the second hard layer. When the second support member moves away from the first support member, the second support member moves with the flexible display screen to a position between the first support member and the flexible display screen.

In the flexible display device of the present disclosure, a soft layer is further disposed between the flexible display screen and the second hard layer. A projection of the second hard layer on the flexible display screen falls within a projection range of the soft layer on the flexible display screen.

In the flexible display device of the present disclosure, a modulus of the soft layer is from 1 MPa to 10,000 MPa.

In the flexible display device of the present disclosure, the soft layer comprises foam material.

In the flexible display device of the present disclosure, a plurality of grooves are disposed at intervals in an upper surface of one of the first support member and the second support member. A plurality of comb teeth are disposed at intervals on the upper surface of the other of the first support member and the second support member, and each of the comb teeth is disposed corresponding to and embedded in each of the grooves.

In the flexible display device of the present disclosure, a cross section of each of grooves is an inverted trapezoid, and a cross section of each of comb teeth is a trapezoid.

In the flexible display device of the present disclosure, a height of a top surface of each of comb teeth is less than or equal to a height of a top opening of each of grooves.

In the flexible display device of the present disclosure, the flexible display device further comprises a guide member disposed within the housing. The second end of the flexible display screen bypasses the guide member and is connected to the winding mechanism.

In the flexible display device of the present disclosure, the guide member is a roller. A pair of circular protrusions are disposed on one of inner walls of two first lateral plates oppositely disposed in the housing and two end faces of the roller. A pair of circular grooves are disposed on the other of the inner walls of the two first lateral plates oppositely disposed in the housing and the two end faces of the roller, and the circular protrusions are embedded in the circular grooves.

In the flexible display device of the present disclosure, a pair of slide grooves are disposed on inner walls of two first lateral plates oppositely disposed in the housing, and two sides of the second support member are movably disposed in the pair of the slide grooves.

In the flexible display device of the present disclosure, a pair of slots are disposed on the inner walls of the two first lateral plates, and two sides of the first support member are fixedly disposed in the pair of the slots.

In the flexible display device of the present disclosure, the winding mechanism comprises a first winding mechanism, a second winding mechanism, and a transmission component. The first winding mechanism is fixed to the second support member, the transmission component is fixed to the housing, and the second winding mechanism is movably disposed with the transmission component. When the flexible display screen is in a first state, the transmission component controls the first winding mechanism and the second winding mechanism to slide in directions away from each other. When the flexible display screen is in a second state, the transmission component controls the first winding mechanism and the second winding mechanism to slide in a direction approaching each other.

Beneficial Effect

The beneficial effect of the present disclosure is that the present disclosure provides a flexible display device comprising a housing provided with a winding mechanism, a flexible display screen and a hard layer. The housing comprises a first support member fixedly disposed with the housing, and a second support member slidably disposed with the first support member. A first end of the flexible display screen is connected to one end of the second support member away from the first support member, and a second end of the flexible display screen is connected to the winding mechanism. The hard layer comprises a first hard layer disposed between the first support member and the flexible display screen, and a second hard layer disposed between the first hard layer and the flexible display screen. One side of the first hard layer away from the flexible display screen is fixedly connected to one side of the first support member, and one side of the second hard layer away from the flexible display screen is fixedly connected to one side of the second support member. In present disclosure, by disposing the first hard layer between the first support member and the flexible display screen, and the second hard layer between the second support member and the flexible display screen, when touching the flexible display screen, the first hard layer and the second hard layer cooperate with each other, which may reduce the touch gap feeling caused by the unevenness of the surfaces of the first support member and the second support member, thereby enhancing the touching experience of the user.

BRIEF DESCRIPTION OF DRAWINGS

In order to more clearly illustrate the technical solutions in the embodiments of the present disclosure, the drawings used in the description of the embodiments will be briefly described below. It is obvious that the drawings in the following description are only some embodiments of the present disclosure. Other drawings can also be obtained from those skilled persons in the art based on these drawings without making any creative effort.

DETAILED DESCRIPTION OF PREFERRED EMBODIMENTS

Figure 1:
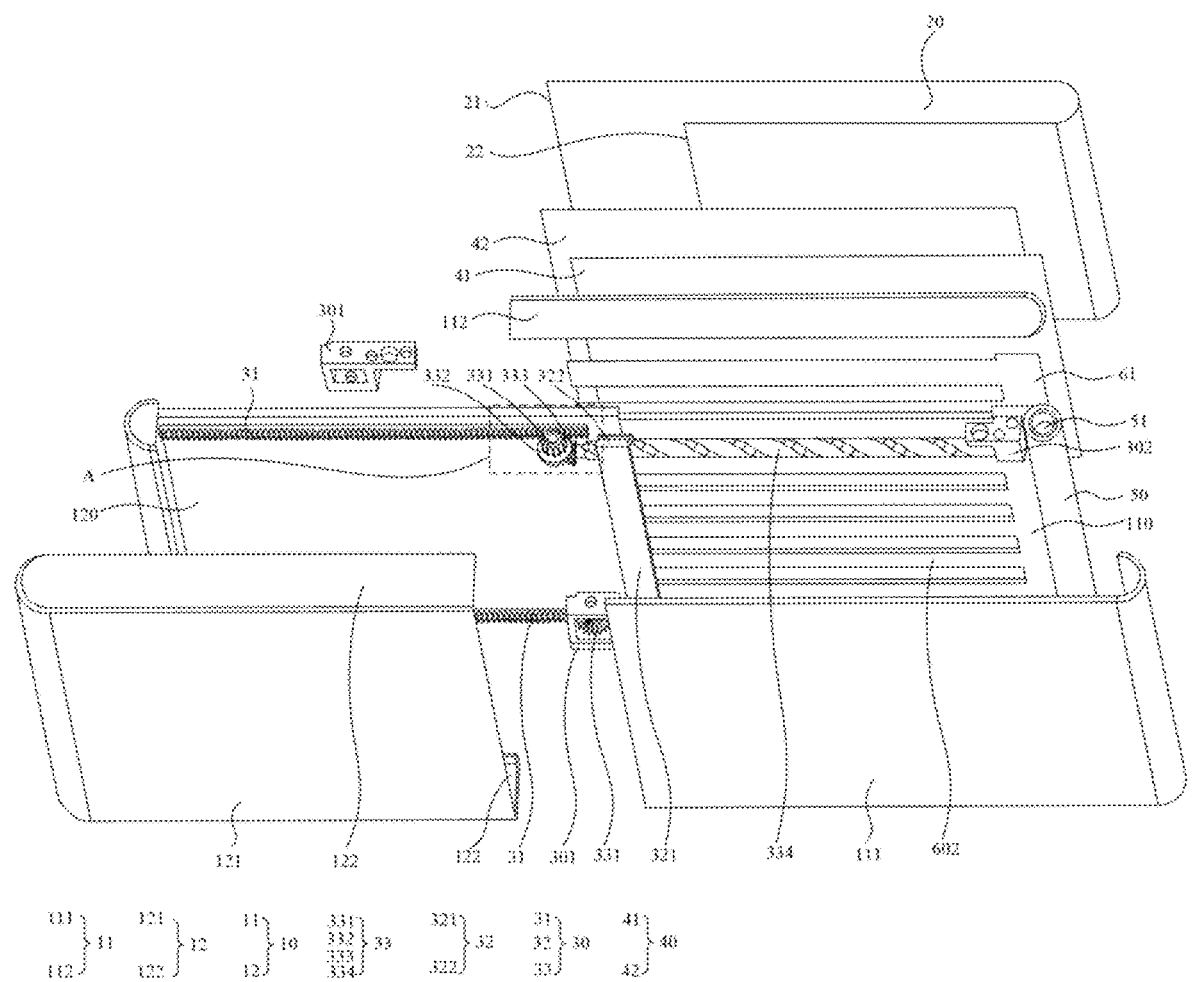
FIG. 1 is an exploded schematic view of the flexible display device according to one embodiment of the present disclosure.

The description of each of the following embodiments is provided with reference to the appending drawings to exemplify the specific embodiment that may be implemented. The terms, such as "upper," "lower," "front," "back," "left," "right," "inside," "outside," "lateral sides," etc. are based on the orientational or positional relationship shown in the drawings, and the terms are merely for convenience of description of the present invention, and thus they are not to be construed as limiting. In the drawings, similar units of the structures are shown in the same symbols.

One embodiment of the present disclosure provides a flexible display device, which is used to alleviate the technical problem of touch gap feeling when a flexible display screen is touched in the conventional flexible display device.

Figure 4:
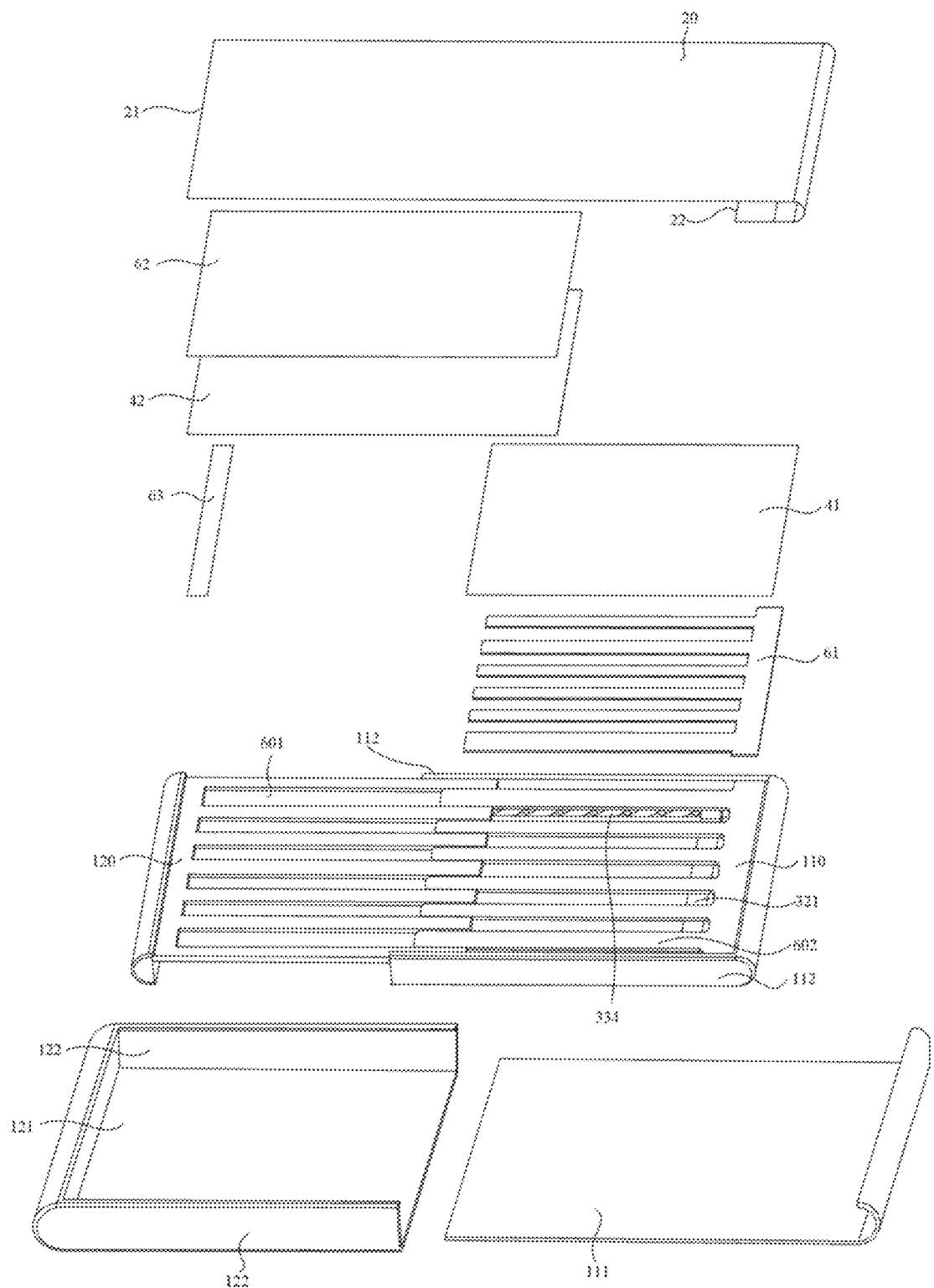
FIG. 4 is an exploded schematic view of the flexible display device in the first state according to one embodiment of the present disclosure.
Figure 5:
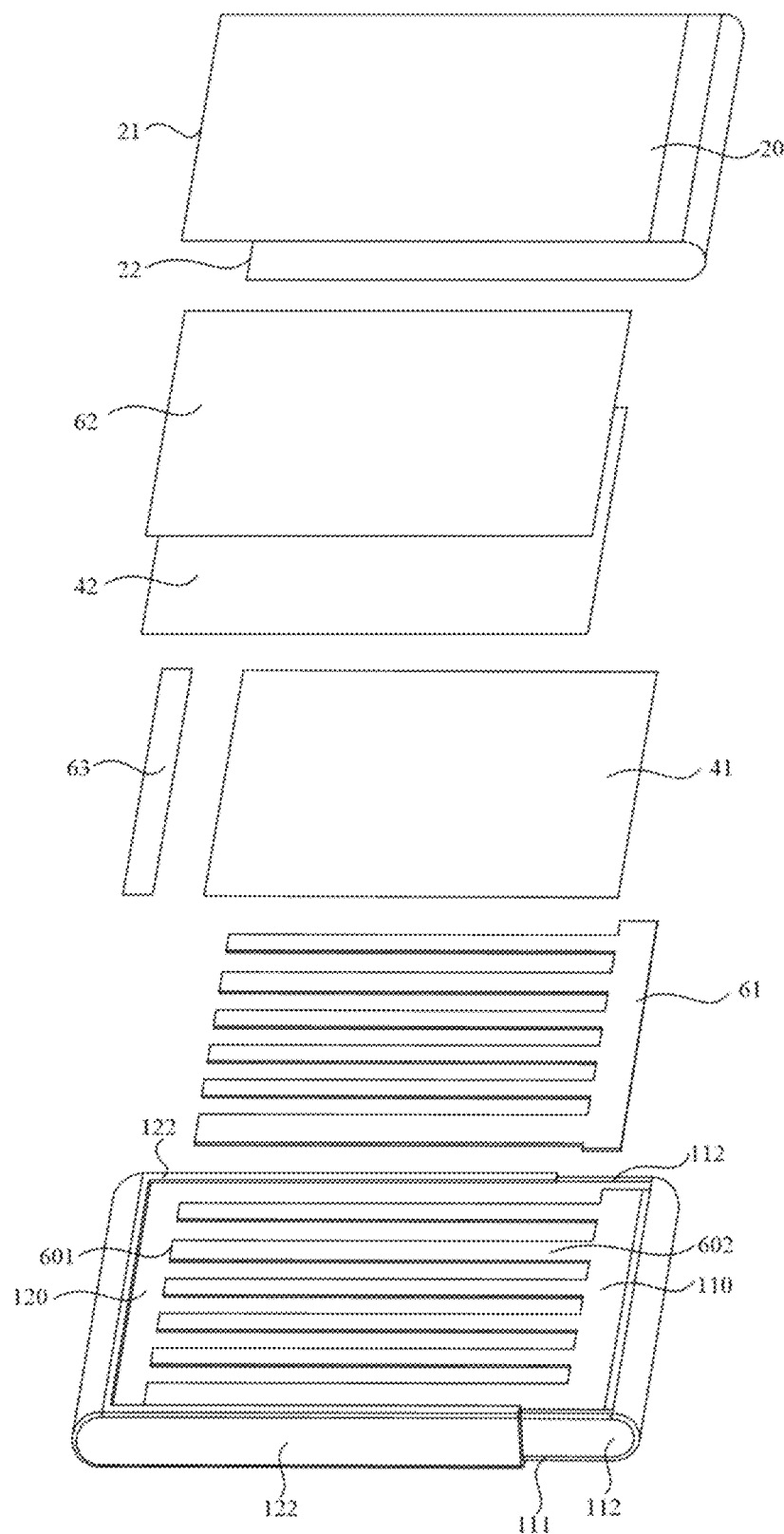
FIG. 5 is an exploded schematic view of the flexible display device in the second state according to one embodiment of the present disclosure.

FIG. 1 is an exploded schematic view of the flexible display device according to one embodiment of the present disclosure. FIG. 4 is an exploded schematic view of the flexible display device in the first state according to one embodiment of the present disclosure. FIG. 5 is an exploded schematic view of the flexible display device in the second state according to one embodiment of the present disclosure. Referring to FIG. 1, FIG. 4 and FIG. 5, the flexible display device of the present disclosure comprises:

a housing 10 disposed with a winding mechanism 30, a first support member 110 fixedly disposed with the housing 10, and a second support member 120 slidably disposed with the first support member 110;

a flexible display screen 20 laid on one side of the first support member 110 and the second support member 120, wherein a first end 21 of the flexible display screen 20 is connected to one end of the second support member 120 away from the first support member 110, and a second end 22 of the flexible display screen 20 is connected to the winding mechanism 30; and a hard layer 40 comprising a first hard layer 41 disposed between the first support member 110 and the flexible display screen 20, and a second hard layer 42 disposed between the first hard layer 41 and the flexible display screen 20, wherein one side of the first hard layer 41 away from the flexible display screen 20 is fixedly connected to one side of the first support member 110, and one side of the second hard layer 42 away from the flexible display screen 20 is fixedly connected to one side of the second support member 42.

The housing 10 may be formed integrally, or may comprise a first housing 11 and a second housing 12. The first housing 11 comprises a first base plate 111 and a first side plate 112 disposed opposite the first base plate 111. The second housing 12 comprises a second base plate 121 and a second side plate 122 disposed opposite the second base plate 122. The first housing 11 may be embedded in the second housing 12 or the second housing 12 may be embedded in the first housing 11, either one way is available. The present embodiment is illustrated by use of the example which the first housing 11 is embedded in the second housing 12. After embedding, the first base plate 111 is parallel to the second base plate 121, and the first side plate 112 is parallel to the second side plates 122.

The first housing 11 comprises a first support member 110, and the second housing 12 comprises a second support member 120. The first support member 110 is fixedly disposed with the first housing 11. The second support member 120 is fixedly disposed with the second housing 12 and is slidably disposed relative to the first housing 11. Thus, when the first support member 110 and the second support member 120 slide relative to each other, the first housing 11 and the second housing 12 may also slide relative to each other.

The flexible display screen 20 usually is an OLED display screen with foldable and rollable functions. The flexible display screen 20 is laid on one side of the first support member 110 and the second support member 120. In FIG. 1, the flexible display screen 20 is laid on one side of the first support member 110 and the second support member 120 away from the first base plate 111. The first end 21 of the flexible display screen 20 is connected to the end of the second support member 120 away from the first support member 110. When connected, the first end 21 of the flexible display screen 20 may be adhered to a surface of the second support member 120 away from the first base plate 111 by an optical clear adhesive, and may also be fixed to the second support member 120 in other ways. The second end 22 of the flexible display screen 20 is connected to the winding mechanism 30, and may be fixed to the winding mechanism 30 by adhering with the optical clear adhesive or clamping with a clamp, or may be fixed in other ways. In one embodiment, the first 21 of the flexible display screen 20 is fixed to the first support member 110, and the second end 22 is connected to the winding mechanism 30. The second end 22 is not used to display images, and an area between the first end 21 and the second end 22 may display images. Part of the area may be located outside or inside the housing 10 according to the degree of winding during the winding process.

The hard layer 40 comprises a first hard layer 41 and a second hard layer 42. The first hard layer 41 is disposed between the first support member 110 and the flexible display screen 20 and is configured as an entire surface relative to the first support member 110. The second hard layer 42 is disposed between the first hard layer 41, and the flexible display screen 20 and is configured as an entire surface relative to the second support member 120. When the first support member 110 and the second support member 120 slide relative to each other, the first hard layer 41 and the second hard layer 42 may also slide relative to each other.

One side of the first hard layer 41 away from the flexible display screen 20 is fixedly connected to one side of the first support member 110. When fixed, the first hard layer 41 and the first support member 110 may be fixed by a first adhesive layer 61. One side of the second hard layer 42 away from the flexible display screen 20 is fixedly connected to one side of the second support member 120. When fixed, one side of the second hard layer 42 close to the flexible display screen 20 is adhered to one side of the flexible display screen through a second adhesive layer 62. One side of the second hard layer 42 away from the flexible display screen 20 is adhered to one side of the second support member 120 through a third adhesive layer 63. The material of the first adhesive layer 61, the second adhesive layer 62, and the third adhesive layer 63 may be an optical clear adhesive.

According to different needs of users, the flexible display screen 20 may be in different states. In one embodiment, the first state refers to a large screen display state, and the second state refers to a small screen display state. In the two states, the portion of the flexible display screen 20 located in the flexible display device may be used to display images.

Figure 6:
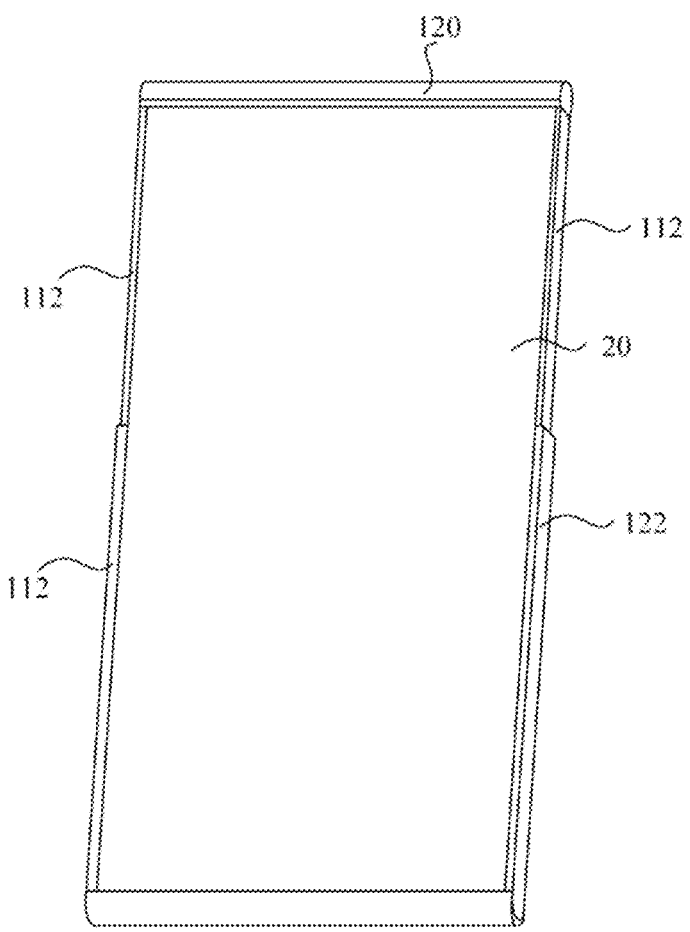
FIG. 6 is a front schematic view of the flexible display device in the first state according to one embodiment of the present disclosure.
Figure 7:
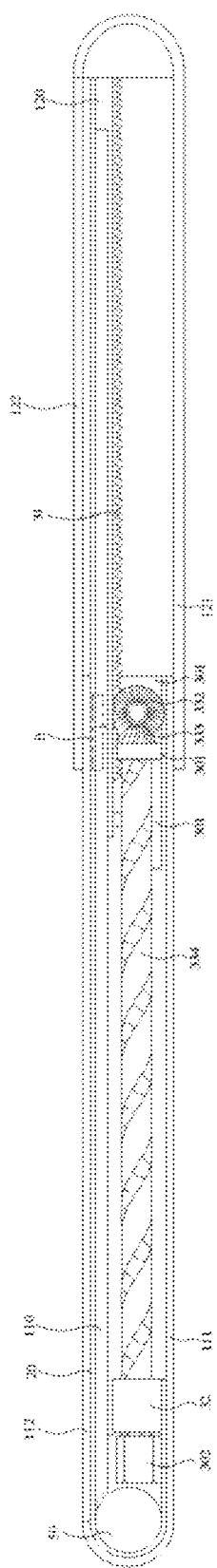
FIG. 7 is a side schematic view of the flexible display device in the first state according to one embodiment of the present disclosure.

When the flexible display screen 20 is in the first state, as shown in FIG. 6 and FIG. 7, when the first support member 110 and the second support member 120 slide away from each other, the first housing 11 and the second housing 12 may also gradually move away from each other. Part of the area of the flexible display screen 20 is pulled out of the housing by the winding mechanism 30, and this part of the area may be used to display images. When all the stretchable areas of the flexible display screen 20 are pulled out of the housing 10, the flexible display device may achieve the large screen display, and the display area of the flexible display screen 20 is the maximum display area in this case.

Figure 9:
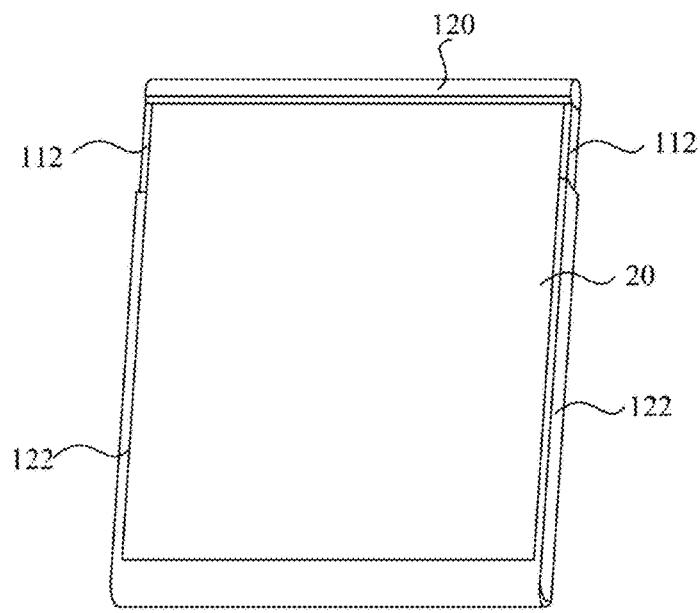
FIG. 9 is a front schematic view of the flexible display device in the second state according to one embodiment of the present disclosure.
Figure 10:
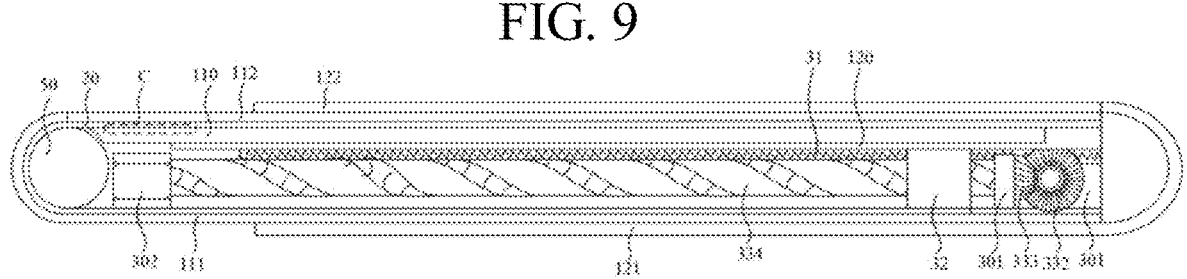
FIG. 10 is a side schematic view of the flexible display device in the second state according to one embodiment of the present disclosure.

When the flexible display screen 20 is in the second state, as shown in FIG. 9 and FIG. 10, when the first support member 110 and the second support member 120 slide toward each other, the first housing 11 and the second housing 12 also gradually move towards each other. At least part of the area of the flexible display screen 20 is retracted into the housing 10 by the winding mechanism 30. When the stretchable areas of the flexible display screen 20 are all retracted into the housing 10, the flexible display device may achieve the small screen display, and the display area of the flexible display screen 20 is the initial display area in this case.

By the disposing method described above, the flexible display device may be switched between the first state and the second state. When the large screen display is needed for the flexible display screen 20, the area needed to be displayed is pulled out of the housing 10 to increase the display area of the flexible display device, and to make the display content more abundant. When the small screen display is needed for the flexible display screen 20, the area not needed to be displayed is restracted into the housing 10, so that the flexible display device has a smaller size, takes up less space, and is easy to carry. The flexible display device of the present disclosure may flexibly control the display area of the flexible display screen 20, and the housing 10 may also protect the internal flexible display screen 20 from damage.

Since the first support member 110 and the second support member 120 jointly provide the support for the flexible display screen 20, in order to achieve the relative sliding arrangement between the first support member 110 and the second support member 120, the first support member 110 and the second support member 120 are disposed to be in a state of nesting with each other. That is, the first support member 110 and the second support member 120 may not separate from each other during the stretching process. Therefore, when the first support member 110 and the second support member 120 provide the support to the flexible display screen 20, the support surface may exhibit unevenness. When the support surface of the flexible display screen 20 is being touched, a touch gap may be felt feeling. That is, it is felt that the bottom of the flexible display screen 20 is not an even plane, but has uneven areas.

FIG. 1, FIG. 4 and FIG. 5 show one of the situations in which the first support member 110 and the second support member 120 jointly provide the support for the flexible display screen 20. A plurality of grooves 601 are disposed at intervals on the upper surface of one of the first support member 110 and the second support member 120, and a plurality of comb teeth 602 are disposed at intervals on the upper surface of the other of the first support member 110 and the second support member 120. Each of the comb teeth 602 is disposed to have one-to-one correspondence to and embedded in each of the grooves 601.

In this embodiment, the plurality of grooves 601 disposed on the second support member 120 and the plurality of comb teeth 602 disposed on the first support member 110 are used as an example for description. When the flexible display screen 20 is pulled out of the housing 10 along with the movement of the second support member 120, since the first support member 110 is fixed to the two first side plates 112 and remains stationary, the comb teeth 602 gradually move away from the grooves 601 as the second support member 120 slides, and each of the length of the comb teeth 602 embedded in each of the grooves 601 gradually becomes shorter. When the flexible display screen 20 is retracted into the housing 10 along with the movement of the second support member 120, the comb teeth 602 gradually slide towards the grooves 601 as the second support member 120 moves, and each of the length of the comb teeth 602 embedded in each of the grooves 601 gradually becomes longer. Therefore, during the movement of the second support member 120, the first support member 110 and the second support member 120 always have an overlapping area, so that the portion of the flexible display screen 20 outside the housing 10 is supported.

In order to enhance the touching experience of the user, as shown in FIG. 1, FIG. 4 and FIG. 5, the hard layer 40 is disposed on the flexible display device of the present disclosure. The hard layer 40 comprises a first hard layer 41 disposed between the first support member 110 and the flexible display screen 20, and the second hard layer 42 disposed between the first hard layer 41 and the flexible display screen 20. One side of the first hard layer 41 away from the flexible display screen 20 is fixedly connected to one side of the support member 110, and one side of the second hard layer 42 away from the flexible display screen 20 is fixedly connected to one side of the second support member 120.

In one embodiment, at least part of the areas of the first hard layer 41 and the second hard layer 42 overlap with each other. The support structure in which the comb teeth 602 and the grooves 601 cooperate with each other is taken as an example. When individually touching the area with the grooves 601 or the area with the comb teeth 602 of the flexible display screen 20, since the grooves 601 and the comb teeth 602 are both covered by the entire first hard layer 41 and the entire second hard layer 42, and the grooves 601 and the comb teeth 602 will not be touched. Whereas when touching the area where the touch comb teeth 602 and the grooves 601 are embedded together, since the first hard layer 41 and the second hard layer 42 overlap each other, the area is equivalent to two hard layers, thus it is more difficult to feel the unevenness generated by the comb teeth 602 and the grooves 601 when touching, thereby reducing the touch gap feeling.

Figure 12:
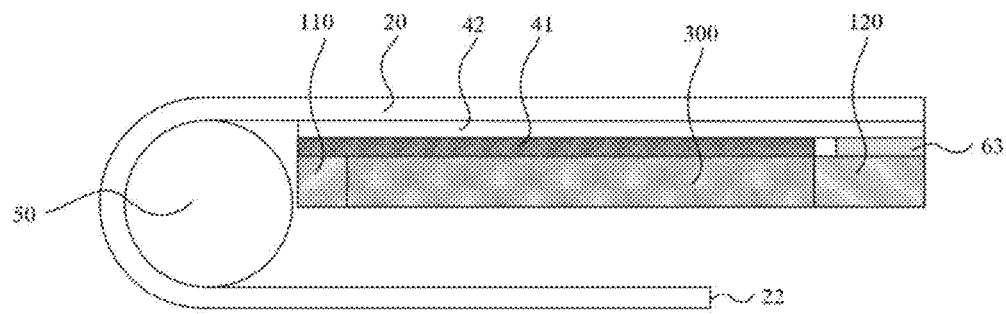
FIG. 12 is a schematic view a first support situation of the hard layer in the flexible display device according to one embodiment of the present disclosure.
Figure 12:
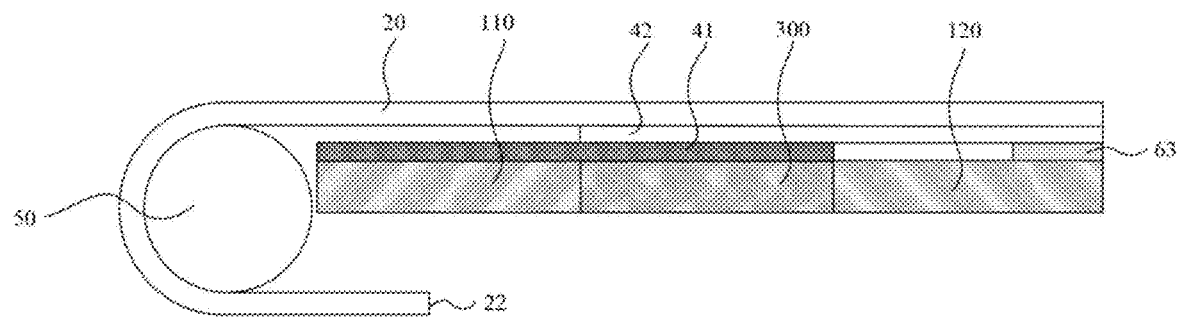

FIG. 12 is a schematic view a first support situation of the hard layer in the flexible display device according to one embodiment of the present disclosure. In one embodiment, FIG. 12*a* is a schematic view of a support situation of the flexible display device in the second state, and FIG. 12*b* is a schematic view of the support situation of the flexible display device in the first state.

Figure 11:
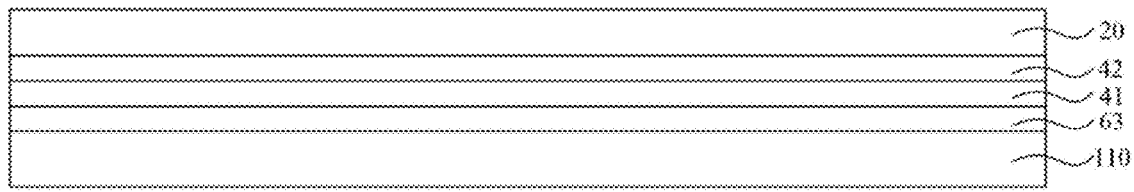
FIG. 11 is an enlarged schematic view of the structure at C in FIG. 10.

When the flexible display screen 20 is in the second state, the grooves 601 in the second support member 120 and the comb teeth 602 in the first support member 110 are all engaged. As shown in FIG. 10, FIG. 11 and FIG. 12, the occlusion area 300 of the first support member 110 and the second support member 120 is large. The first support member 110 and the second support member 120 together provide the support for the first hard layer 41, the first hard layer 41 provides the support for the second hard layer 42, and the second hard layer 42 further provides the support for the flexible display screen 20. That is, all areas of the first hard layer 41 overlap the second hard layer 42.

Figure 8:
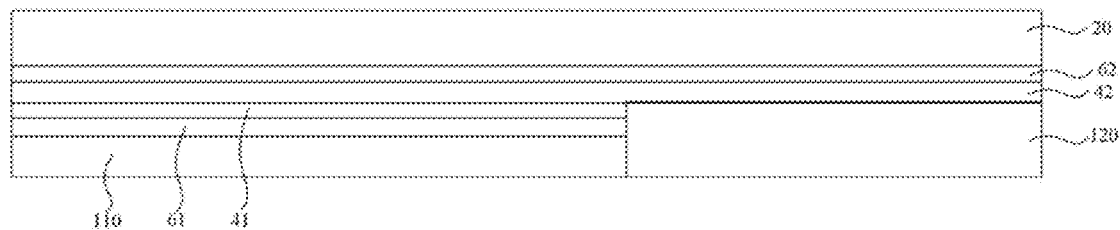
FIG. 8 is an enlarged schematic view of the structure at B in FIG. 7.

When the flexible display device is in the first state, the grooves 601 in a first winding mechanism 31 and the comb teeth 602 in the first support member 110 are partially engaged. As shown in FIG. 7, FIG. 8 and FIG. 12*a*, the second support member 120 drives the flexible display screen 20 and the second hard layer 42 to move away from the first support member 110 together. The occlusion area 300 of the first support member 110 and the second support member 120 is decreased. The first hard layer 41 and the second hard layer 42 are changed from a stacked state to a partially stacked state, and the overlapping area is decreased. In this case, the portion of the flexible display screen 20 outside the housing 10 is partially supported by the first hard layer 41 alone, and the other part is supported by the second hard layer 42 alone. In the portion of the flexible display screen 20 between the first hard layer 41 and the second hard layer 42, the second hard layer 42 is supported by the first hard layer 41 and then the flexible display screen 20 is supported by the second hard layer 42.

By disposing the hard layer described above, the structure formed by nesting the comb teeth 602 and the grooves 601 may directly reduce the touch gap feeling when the user touches the flexible display screen 20, so that the flexible display device of the present disclosure provides nearly full surface support to the upper surface of the flexible display screen 20 in any sliding state.

Since an overlapping portion between the second hard layer 42 and the first hard layer 41 is always existed, there must be a stage difference in the thickness direction of the film material at the ends of the overlapping portion, which may also cause unevenness when the flexible display screen 20 is pressed. Therefore, moreover, the second hard layer 42 and the first hard layer 41 should be hard enough to eliminate the touch gap feeling of the individual comb-like structure and the individual groove-like structure. Moreover, they should be thin enough to reduce the unevenness caused by the stage difference. Therefore, the thickness of the second hard layer 42 and the thickness of the first hard layer 41 are limited from 0.01 mm to 0.5 mm, and the modulus is limited from 5000 MPa to 500000 MPa.

In one embodiment, when the area of the first hard layer 41 is greater than the area of the first support member 110, and the area of the second hard layer 42 is greater than the area of the second support member 120, The grooves 601 on the second support member 120 are all covered by the second hard layer 42, and the comb teeth 602 on the first support member 110 are also covered by the first hard layer 41. In this case, when any position of the first support member 110 and the second support member 120 is being touched, and no touch gap may be felt, thereby enhancing the touching effect.

Figure 13:
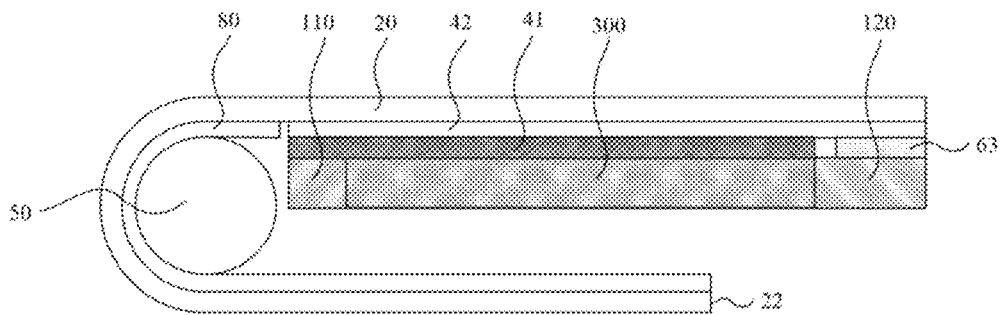
FIG. 13 is a schematic view a second support situation of the hard layer in the flexible display device according to one embodiment of the present disclosure.
Figure 13:
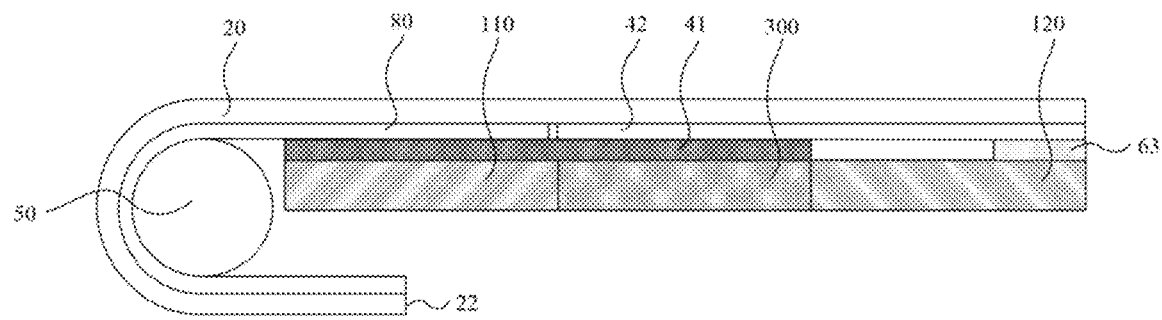

FIG. 13 is a schematic view a second support situation of the hard layer in the flexible display device according to one embodiment of the present disclosure. FIG. 13a is a schematic view of a supporting state of the flexible display device in the second state, and FIG. 13b is a schematic view of a supporting situation of the flexible display device in the second state. The difference from the structure in FIG. 12 is that, in the present embodiment, a compensation layer 80 is further disposed on one side the flexible display screen 20 close to the first support member 110. The compensation layer 80 is located in an area where the second hard layer 42 is not disposed. The thickness of the compensation layer 80 is less than or equal to the thickness of the second hard layer 42. The compensation layer 80 and the flexible display screen 20 may be integrally formed. That is, the film material of the lower surface of the flexible display screen 20 is directly formed into a structure with a stage difference, or may also be independently formed, which the flexible film layer with a thickness similar to the second hard layer 42 to serves as the compensation layer 80 is prepared first, and then the compensation layer 80 is adhered to the lower surface of the flexible display screen 20. The compensation layer 80 may be disposed on all portion of the flexible display screen 20 that may be pulled out of the housing 10.

One end of the compensation layer 80 is adjacent to one end of the second hard layer 42. When the second support member 120 moves away from the first support member 110, the compensation layer 80 moves along with the flexible display screen 20 between the first support member 110 and the flexible display screen 20. Therefore, when the second support member 120 moves away from the first support member 110, the stage difference present in the area where the second hard layer 42 and the first hard layer 41 do not overlap is compensated by the compensation layer 80, thereby reducing the unevenness when touching here.

In one embodiment, a soft layer (not shown in the figure) is further disposed between the flexible display screen 20 and the second hard layer 42. The projection of the second hard layer 42 on the flexible display screen 20 falls within a projection range of the soft layer on the flexible display screen 20. That is, the edge of the soft layer exceeds the edge of the second hard layer 42. The modulus of the soft layer is from 1 Mpa to 10,000 MPa, and the material comprises foam. By disposing the soft layer, the uneven touch caused by the stage difference at the edge of the second hard layer 42 may be alleviated.

It should be noted that in the above embodiment, the structure in which the first support member 110 and the second support member 120 form the grooves 601 and the comb teeth 602 cooperated with each other is used as an example to describe the arrangement of the hard layer 40, but not limited in the present disclosure. The shapes and the connection manners of the first support member 110 and second support member 120 that may support the flexible display screen 20 by relative sliding are not limited, and all of the shapes and the connection manners fall within the claim scope of the present disclosure. Moreover, the hard layer 40 may be disposed based on the same principle, and may also play a role in reducing the touch gap feeling.

In addition, in the flexible display device of the present disclosure, since the first housing 11 is embedded in the second housing 12, the first housing 11 and the second housing 12 are staggered in the thickness direction, and the second housing 12 wraps the first base plate 111 and the two first side plates 112 of the first housing 11. As the first housing 11 and the second housing 12 slide towards different directions, the overlapping area of the first housing 11 and the second housing 12 may increase and decrease accordingly. The distance between a bottom surface of the first base plate 111 and a bottom surface of the second base plate 112 is less than 1.5 mm, so as to ensure the overall appearance of the flexible display device. The distance between the first base plate 111 and the second base plate 112 is less than or equal to 0.5 mm, so as to provide a complete appearance and an encapsulation for dust particles for the back of the flexible display device.

In one embodiment, each of the length of the comb teeth 602 is less than or equal to each of the length of the grooves 601, so that when the display area of the second support member 120 sliding to the flexible display screen 20 is the initial display area, the comb teeth 602 are fully embedded in the grooves 601 in the length direction. The first support member 110 and the second support member 120 cooperate with each other, and no any large gap exists between the first support member 110 and the second support member 120. Each touch portion of the flexible display screen 20 is supported when the flexible display screen 20 is being touched, which enhances the touch effect. Moreover, the length direction of the grooves 601 may provide a limit for the stretching direction, so that the flexible display screen 20 is evenly stressed during the stretching process.

Figure 14:
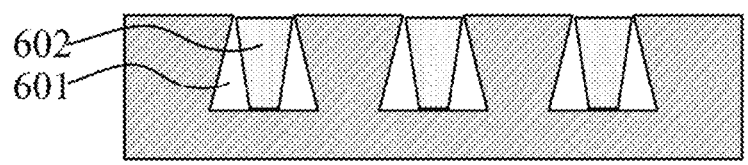
FIG. 14 is a schematic cross-sectional view of grooves and comb teeth in the flexible display device according to one embodiment of the present disclosure.

In one embodiment, as shown in FIG. 14, the cross section of each of the grooves 601 is an inverted trapezoid, the cross section of each of the comb teeth 602 is a trapezoid, and a height of the top surface of each of the comb teeth 602 is less than or equal to a height of the top opening of each of the grooves 601. The cross section of each of the grooves 601 is an inverted trapezoid. That is, the grooves 601 is a dovetail groove. An area of the bottom surface of each of the grooves 601 is larger than an area of the top opening of each of the grooves 601, and the top surface of each of the comb teeth 602 is located below or flush with the top opening of each of the grooves 601. Therefore, when each of the comb teeth 602 is embedded in each of the grooves 601, the top opening of each of the grooves 601 may provide a limit in the vertical direction, so that each of the entire comb teeth 602 may not pass through each of the opening of the grooves 601, thereby preventing the comb teeth 602 of the first support member 110 from tilting upward to scratch the flexible display screen 20.

As shown in FIG. 1, FIG. 4, FIG. 5, FIG. 6 and FIG. 7, the winding mechanism 30 comprises the first winding mechanism 31, the second winding mechanism 32, and the transmission assembly 33. The first winding mechanism 31 is fixed to the second support member 120, and the transmission assembly 33 is fixed to the first housing 11. The second winding mechanism 32 is movably disposed with the transmission assembly 33. When the flexible display screen 20 is in the first state, the transmission assembly 33 controls the first winding mechanism 31 and the second winding mechanism 32 to slide in directions away from each other. When the flexible display screen 20 is in the second state, the transmission assembly 33 controls the first winding mechanism 31 and the second winding mechanism 32 to slide in a direction approaching each other.

The first winding mechanism 31 is located above the second winding mechanism 32. The first winding mechanism 31 is fixed to the second support member 120. The transmission assembly 33 is fixed to the first housing 11. The second winding mechanism 32 is movably disposed with the transmission assembly 33. When operating, the transmission assembly 33 may drive the first winding mechanism 31 and the second winding mechanism 32 to move in an opposite direction of stretching. In one embodiment, the stretching direction is parallel to the long side of the first side plate 112, which refers to the horizontal direction in FIG. 1. Based on different states of the flexible display screen 20, the direction in which the transmission assembly 33 drives the first winding mechanism 31 and the second winding mechanism 32 to move is also different, and both of the first winding mechanism 31 and the second winding mechanism 32 may be gradually approached to each other along the stretching direction, or both of the first winding mechanism 31 and the second winding mechanism 32 may be gradually away from each other along stretching direction. In addition, since the first winding mechanism 31 is fixed to the second support member 120, and the second support member 120 is fixed to the second housing 12, the second housing 12 may also move together driven by the first winding mechanism 31.

In the first housing 11, the two first side plates 112 may be integrally formed with the first base plate 111 or may be independently formed and then disposed on the first base plate 111. In the present embodiment, an independent forming method is used. A pair of clamping grooves are disposed on an inner wall of each of the first side plate 112, and each of two sides of the first support member 110 is fixedly disposed in each of the pair of clamping grooves, respectively. The first support member 110 and the two first side plates 112 may not move or rotate relatively.

The first end 21 of the flexible display screen 20 is fixed to the second support member 120, the second end 22 of the flexible display screen 20 is fixed to the second winding mechanism 32 in the winding mechanism 30. The transmission assembly 33 controls the relative sliding of the first winding mechanism 31 and the second winding mechanism 12 by controlling the sliding directions of the first winding mechanism 31 and the second winding mechanism 32, and finally controls the pull of the flexible display screen 20 out of the housing 10 and the retraction of the flexible display screen 20 into the housing 10.

During the process of the flexible display screen 20 being pulled out or retracted into the housing 10, the transmission assembly 33 may control the first winding mechanism 31 and the second winding mechanism 32 to stop moving at any time, so that the flexible display device may be controlled to select an area of any size for display between the initial display area and the maximum display area, which is flexible.

The second support member 120 moves along with the first winding mechanism 31 in the stretching direction to drive the flexible display screen 20 to be retracted into and pulled out of the housing 10. In order to keep the second support member 120 consistent with the stretching direction during movement, it is necessary to provide a limit structure on each of the two first side plates 112.

In one embodiment, each of a pair of slide grooves is disposed on each of the inner walls of the two first side plates 112, and each of the two sides of the second support member 120 is movably disposed in each of the slide grooves. Specifically, each of a pair of sliders is disposed on each of the two sides of the second support member 120. Each of the sliders is embedded in each of the slide grooves and slides back and forth along the length of the slide grooves. In one embodiment, the slide groove extends along the stretching direction. As such, it is ensured that the flexible display screen 20 outside the housing 10 is also retracted into and pulled out of the housing 10 in this direction. When the pictures on the flexible display screen 20 is viewed, the screen is not tilted, which ensures the viewing effect.

Figure 2:
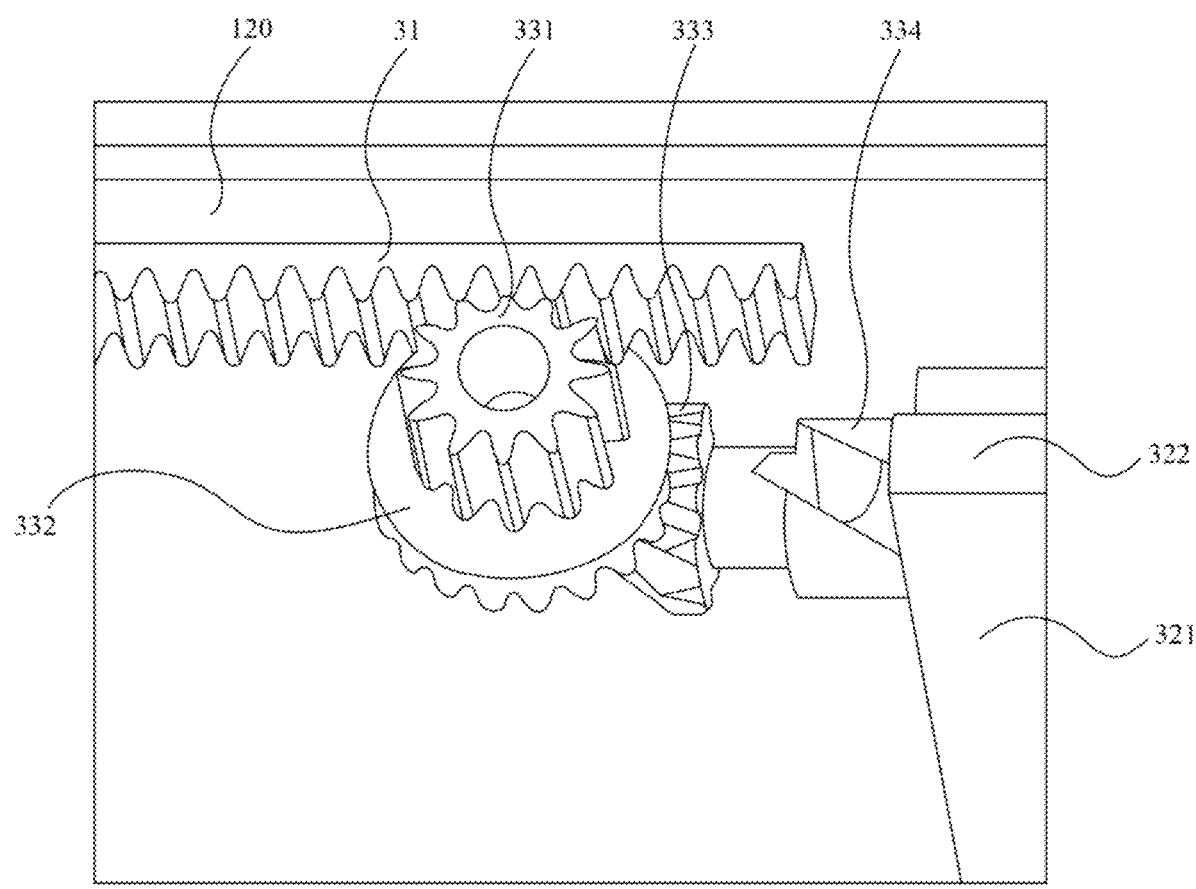
FIG. 2 is an enlarged schematic view of the structure at A in FIG. 1.
Figure 3:
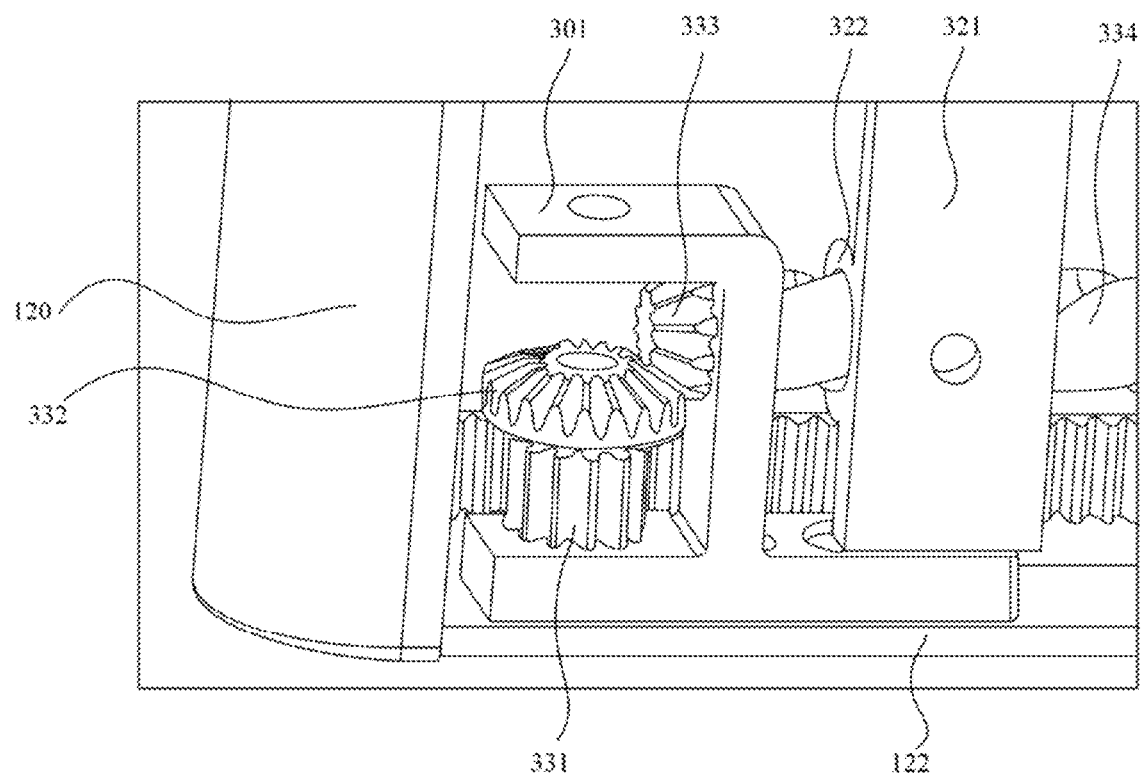
FIG. 3 is another perspective view of the structure in FIG. 2.

FIG. 2 is an enlarged schematic view of the structure at A in FIG. 1, and FIG. 3 is another perspective view of the structure in FIG. 2. Referring to FIG. 1, FIG. 2, and FIG. 3, the transmission assembly 30 comprises a first transmission assembly and a second transmission assembly respectively fixed on each of the inner walls of the two first side plates 112. The first transmission assembly and the second transmission assembly both comprises a circular gear 331, a first bevel gear 332, a second bevel gear 333 and a screw 334. The first bevel gear 332 is fixed on one side of the circular gear 331, and coaxial with the circular gear 331. The rotational direction and the rotational speed of the circular gear 331 and the first bevel gear 332 are the same. The second bevel gear 333 meshes with the first bevel gear 332. That is, the modulus of the second bevel gear 333 is equal to the modulus of the first bevel gear 332, and a gear pair is formed between the first bevel gear 332 and the second bevel gear 333. The second bevel gear 333 is fixed at a first end of the screw 334. The screw 334 and the second bevel gear 333 are coaxial, and the rotational direction and rotational rate of the screw 334 and the second bevel gear 333 are the same.

In the first transmission assembly and the second transmission assembly, the circular gear 331 and the second bevel gear 333 are both fixed to the inner wall of the first side plate 112 through a gear bracket 301. A second end of the screw 334 is fixed to the inner wall of the first side plate 112 by a screw bracket 302. The gear bracket 301 provides the support for the circular gear 331, the first bevel gear 332, and the second bevel gear 333, and indirectly provides the support for the first end of the screw 334. The circular gear 331, the first bevel gear 332, and the second bevel gear 333 may rotate freely along its own axis. The screw bracket 302 provides the support for the second end of the screw 334, and the screw 334 may also rotate freely along its own axis.

In one embodiment, the first winding mechanism 31 comprises two racks fixed to the bottom surface of the second support member 120. Each of the two racks is respectively close to each of the two first side plates 112. One of the two racks meshes with the circular gear 331 of the first transmission assembly, and the other of the two racks meshes with the circular gear 331 of the second transmission assembly. That is, each of the two racks respectively forms a gear pair with each of the two circular gears 331.

The second winding mechanism 32 comprises a sliding plate 321 and two sleeves 322. Each of the sleeves is respectively disposed at each end of the sliding plate. Each of the sleeves 322 is respectively nested with the screw 334 of the first transmission assembly and the screw 334 of the second transmission assembly. A protrusion is disposed on the inner wall of each of the sleeves 322 (not shown in the figure). The protrusion is matched with a female thread of the screw 334.

When the flexible display device switches between the first state and the second state, the rotation of the circular gear 331 drives the first winding mechanism 31 and the second winding mechanism 32 to move, and the power of the circular gear 331 comes from a driving mechanism of the flexible display device (not shown in the figure).

When the flexible display screen 20 is in the first state, the driving mechanism drives the circular gear 331 to rotate along a first direction. The circular gear 331 drives the first winding mechanism 31 to move away from the first winding mechanism 32 by meshing with the rack. Moreover, the rotational direction and speed of the first bevel gear 332 and the circular gear 331 are the same. The first bevel gear 332 drives the screw 334 to rotate by meshing with the second bevel gear 333. Since the female thread of the screw 334 is matched with the protrusion structure on the inner wall of the sleeve 322, the protrusion structure on the inner wall of the sleeve 322 mat only slide within the female thread. Therefore, when the screw 334 rotates, the sliding plate 321 is pulled by the female thread to slide in an opposite direction of the rack slide. That is, the circular gear 331 drives the second winding mechanism 32 to move away from the first winding mechanism 31.

Similarly, when the flexible display screen 20 is in the second state, the driving mechanism drives the circular gear 331 to rotate along a second direction. The circular gear 331 drives the first winding mechanism 31 to move approach to the second winding mechanism 32 by meshing with the rack. By matching the first bevel gear 332, the second bevel gear 333 and the screw 334 with each other, the second winding mechanism 32 is driven to move approach to the first winding mechanism 31. In one embodiment, the first direction is one of the directions of clockwise or counterclockwise, and the second direction is the other of the directions of clockwise or counterclockwise.

The driving mechanism may be a motor or a deceleration device connected to the circular gear 331. Driving the circular gear 331 with the motor or the deceleration device allows the entire motion system to be controlled by electrical signals. The user only needs to transmit the electrical signals to the motor through the buttons to drive the entire movement of the motion system, which allows the flexible display device of the present disclosure to switch between the retracted and stretched display states.

In the flexible display device of the present disclosure, when the transmission assembly 33 drives the first winding mechanism 31 and the second winding mechanism 32 to move, the moving distance and the moving speed of the first winding mechanism 31 and the moving distance and the moving speed of the second winding mechanism 32 are equal. Specifically, by controlling the pitch circle diameter d1 of the circular gear 331, the pitch circle diameter d2 of the first bevel gear 332, the pitch circle diameter d3 of the second bevel gear 333, and the screw pitch L of the female thread on the screw 334, the sliding distance (speed) of the rack and the sliding distance (speed) of the sliding plate 321 always is kept equal and moved in opposite directions.

In one embodiment, the formula is satisfied among the four: $d2*L=\pi*d1*d3$. Assuming that the moving distance of the rack is a, and the rotation angle of the circular gear 331 meshed with the rack is $\alpha 1$, both of them satisfy $\alpha 1=2a/d1$. Since the first bevel gear 332 and the circular gear 331 are coaxial and fixed, the rotation angle of the first bevel gear 332 is also $\alpha 1$, the first bevel gear 332 and the second bevel gear 333 are meshed with each other. If the rotation angle of the second bevel gear 333 is $\alpha 2$, then $d2*\alpha 1=d3*\alpha 2$, and $\alpha 2=d2*\alpha 1/d3$ is obtained. Moreover, since the second bevel gear 333 is coaxial and fixed to the screw 334, the rotation angle of the screw 334 is also $\alpha 2$. If the screw pitch of the screw is L, and the sliding distance of the sliding plate 321 is b, when the screw 334 makes one revolution, the sliding distance of the sliding plate 321 is also L. Therefore, the sliding distance of the sliding plate 321 pushed by the screw 334 satisfies $b=\alpha 2/2/\pi*L$. Since the minimum pulling of the flexible display screen 20 during the sliding process needs to be satisfied, a should be equal to b (a=b) to obtain $d2*L=\pi*d1*d3$.

When the formula is satisfied, when the flexible display screen 20 is pulled out of the housing 10, the length of the portion of the first winding mechanism 31 pulled out from the inside of the housing 10 is equal to the length of the portion of the second winding mechanism 32 sent out to the outside of the housing 10, and the speed of pulling out and sending out is the same. Therefore, the flexible display screen 20 is greatly pulled when it is extended outward and retracted inward, thereby providing a protective effect on the flexible display screen 20 and extending the service life of the flexible display screen 20.

In the above embodiment, the flexible display screen 20 may be switched between the first state and the second state by matching the rack, the circular gear 331, the first bevel gear 332, the second bevel gear 333, the screw 334, the sleeve 322, and the sliding plate 321. However, the winding mechanism 30 of the present disclosure is not limited thereto. In one embodiment, the flexible display device further comprises a sliding member disposed in the housing 10. The sliding member is slidably disposed in the housing 10. The first winding mechanism 31 comprises the first rack disposed on one side of the second support member 120 closer to the sliding member. The second winding mechanism 32 comprises a second rack disposed on one side of the sliding member close to the second support member 120. The transmission assembly 33 comprises a gear and a gear pin that passes through the central hole of the gear. The gear pin is movably disposed in a transmission groove, which may make the gear rotate clockwise or counterclockwise around its axis. The gear meshes with the first rack and the second rack, and the gear meshes with both the first rack and the second rack. That is, the moduli of the first rack and the second rack are equal. Therefore, the first rack and gear cooperate to form a gear pair, and the second rack and gear also form a gear pair.

When the flexible display device switches between the first state and the second state, the rotation of the gear drives the first winding mechanism 31 and the second winding mechanism 32 to move, and the power of the gear comes from the driving mechanism of the flexible display device. When the display screen 20 is in the first state, the driving mechanism drives the gear to rotate in the first direction. The gear drives the first winding mechanism 31 to move away from the second winding mechanism 32 by meshing with the first rack, and drives the second winding mechanism 32 to move away from the first winding mechanism 31 by meshing with the second rack. When the flexible display screen 20 is in the second state, the driving mechanism drives the gear to rotate in the second direction. The gear drives the first winding mechanism 31 to move approach to the second winding mechanism 32 by meshing with the first rack, and drives the second winding mechanism 32 to move approach to the first winding mechanism 31 by meshing with the second rack. In one embodiment, the first direction is one of clockwise or counterclockwise, and then the second direction is the other of clockwise or counterclockwise.

The driving mechanism may be a motor or a deceleration device connected to the gear. Driving the gear with the motor or the deceleration device allows the entire motion system to be controlled by electrical signals. The user only needs to transmit electrical signals to the motor through the buttons to drive entire movement of the motion system, which allows the flexible display device of the present disclosure to switch between the retracted and stretched display states.

Since the gear meshes with both the first rack and the second rack, the moving distances of the first winding mechanism 31 and the second winding mechanism 32 always maintain equal and in opposite directions. That is, when the flexible display screen 20 is pulled out of the housing 10, the length of the portion where the first winding mechanism 31 is pulled out from the inside of the housing 10 is equal to the length of the portion where the second winding mechanism 32 is sent out of the housing 10. The speed of pulling out and sending out is the same. Therefore, the flexible display screen 20 is not greatly pulled when it is extended outward and retracted inward, thereby providing a protective effect on the flexible display screen 20 and extending the service life of the flexible display screen 20.

The gear is movably disposed in the transmission groove through the gear pin, and drives the first winding mechanism 31 and the second winding mechanism 32 to move in reverse by its own rotation. In order to make the distance that the first winding mechanism 31 and the second winding mechanism 32 move as long as possible, the transmission groove is disposed at an intermediate position on the inner wall of the first side plate 112. That is, the gear is located at the intermediate position of the flexible display device. The modulus of the gear may be from 0.25 mm to 5 mm.

There are many ways to dispose the first rack, the second rack and the transmission assembly 33.

In one embodiment, the entire surface of the first rack is disposed on one side of the second support member 120 close to the sliding member, and the entire surface of the second rack is disposed on one side of the sliding member close to the second support member 120. The gear pins penetrate the two ends of the gear and are respectively movably disposed with the transmission grooves on the two first side plates 112. The width of the gear is less than or equal to the distance between the two first side plates 112.

In one embodiment, each of the two first racks parallel to each other is disposed on one side of the second support member 120 close to the sliding member, and each of the two first racks is respectively close to each of the two first side plates 112. Each of the two wo first racks parallel to each other is disposed on one side of the second support member 120 close to the sliding member, and each of the two second racks is respectively close to each of the two first side plates 112 and is corresponding to each of the two first racks 310. The transmission assembly 33 comprises a first transmission assembly and a second transmission assembly that are separated from each other. The gear of the first transmission assembly is movably disposed in the transmission groove of one of the first side plate 112, and the gear pin of the second transmission assembly is movably disposed in the transmission groove of the other of the first side plate 112. The gear in the first transmission assembly meshes with the first rack and the second rack close to one of the first side plates 112, and the gear in the second transmission assembly meshes with the first rack and the second rack close to the other of the first side plates 112.

In this embodiment, the flexible display screen 20 may be switched between the first state and the second state by matching the gear, the gear pin, the first rack and the second rack. The structure of the entire winding mechanism 30 is simple, without needing complicated design. Therefore, the space occupied inside the flexible display device is smaller, which further makes the overall size of the flexible display device smaller and more convenient to carry.

It should be noted that the structure of the winding mechanism 30 is not limited to the above two embodiments, and all of other winding mechanisms which may switch the flexible display screen 20 between the first state and the second state fall within the claim scope of the embodiments of the present disclosure.

In one embodiment, the flexible display device further comprises a guide member 50, each of two ends of the guide member 50 is respectively disposed on an inner wall of each of the two first side plates 112. The guide member 50 is used to provide the direction guidance during the sliding process of the flexible display screen 20, so that the flexible display screen 20 may slide more smoothly. The guide member 50 may be fixedly disposed or movably disposed on the inner walls of the two first side plates 112. The guide member 50 is movably disposed in this embodiment.

Since the flexible display screen 20 is fixed to the second support member 120 and the second winding mechanism 32 in a planar manner, in order to prevent the second area 42 of the flexible display screen 20 from scratching when the edges of the second support member 120 and the second winding mechanism 32 are vertical to the flexible display screen 20, the guide member 50 is disposed on one side of the second support member 120, and the flexible display screen 20 bypasses the guide member 50 to make the first end 21 and the second end 22 of the flexible display screen 20 transfer more smoothly.

In one embodiment, the guide member 50 is a roller, and each of two end surfaces of the roller is movably disposed on the inner wall of each of the two first side plates 112. Specifically, a pair of circular protrusions are disposed on one of inner walls of two first lateral plates and two end faces of the roller, a pair of circular grooves 51 are disposed on the other of the inner walls of the two first lateral plates and two end faces of the roller. The circular protrusions are embedded in the circular grooves 51. That is, as shown in FIG. 1, circular protrusions may be disposed on both inner walls of the two first side plates 112, and circular grooves 51 may be disposed on both end surfaces of the roller, and then the two circular protrusions are snapped into two circular grooves 51. Alternatively, the circular grooves 51 may also be disposed on both inner walls of the two first side plates 112, and the circular protrusions may be disposed on both end surfaces of the roller, and then the two circular protrusions are snapped into the two circular grooves 51, either way. In one embodiment, the center of the circular protrusion and the circular groove 51 both fall on the axis of the roller, so that the roller may rotate around its own axis. When the flexible display screen 20 is pulled out and retracted into the housing 10, the roller may rotate with the moving direction of the flexible display screen 20, so that the flexible display 20 has less resistance when stretched, the pulling is easy, and the bottom surface of the flexible display screen 20 may not produce large friction and extend the service life.

According to the above embodiment:

The present disclosure provides a flexible display device, comprising the housing disposed with the winding mechanism, the flexible display screen, and the hard layer. The housing comprises a first support member fixedly disposed with the housing, and the second support member disposed slidably relative to the first support member. The first end of the flexible display screen is connected to one end of the second support member away from the first support member, and the second end of the flexible display screen is connected to the winding mechanism. The hard layer comprises the first hard layer disposed between the first support member and the flexible display screen, and the second hard layer disposed between the first hard layer and the flexible display screen. One side of the first hard layer away from the flexible display screen is fixedly connected to one side the first support member, and one side of the second hard layer away from the flexible display screen is fixedly connected to one side of the second support member. In present disclosure, by disposing the first hard layer between the first support member and the flexible display screen and the second hard layer between the second support member and the flexible display screen, when the flexible display screen is touched, the first hard layer and the second hard layer cooperate with each other, thereby reducing the touch gap feeling caused by the unevenness of the surfaces of the first support member and enhancing the touching experience of the user.

In the above embodiments, the description of each embodiment has its own emphasis. For one part that is not described in detail in one embodiment, the related descriptions in other embodiments may be referred to.

The flexible display device provided by the embodiments of the present disclosure is described in detail above. Specific examples are used to explain the principle and implementation of the present disclosure. The descriptions of the above embodiments are only used to help understand the technology solutions of the present disclosure and their core concepts. A person ordinarily skilled in the art should understand that he/she may still modify the technical solutions described in the foregoing embodiments, or equivalently replace some of the technical features. These modifications or replacements do not deviate the essence of the corresponding technical solutions from the scope of the technical solutions of the embodiments of the present application.

What is claimed is:

1. A flexible display device, comprising:
a housing disposed with a winding mechanism, a first support member fixedly disposed with the housing, and a second support member slidably disposed with the first support member;
a flexible display screen laid on one side of the first support member and the second support member, wherein a first end of the flexible display screen is connected to one end of the second support member away from the first support member, and a second end of the flexible display screen is connected to the winding mechanism; and
a hard layer comprising a first hard layer disposed between the first support member and the flexible display screen, and a second hard layer disposed between the first hard layer and the flexible display screen, wherein one side of the first hard layer away from the flexible display screen is fixedly connected to one side of the first support member, and one side of the second hard layer away from the flexible display screen is fixedly connected to one side of the second support member.

2. The flexible display device according to claim 1, wherein at least one portion of the first hard layer overlaps at least one portion of the second hard layer.

3. The flexible display device according to claim 2, wherein a thickness of the first hard layer and the second hard layer are both from 0.01 mm to 0.5 mm.

4. The flexible display device according to claim 2, wherein a modulus of the first hard layer and the second hard layer are both from 5,000 MPa to 500,000 MPa.

5. The flexible display device according to claim 1, wherein one side of the first hard layer away from the flexible display screen is adhered to one side of the first support member through a first adhesive layer; one side of the second hard layer close to the flexible display screen is adhered to one side of the flexible display screen through a second adhesive layer, and one side of the second hard layer away from the flexible display screen partially adhered to one side of the second support member through a third adhesive layer.

6. The flexible display device according to claim 1, wherein an area of the first hard layer is greater than an area of the first support member, and an area of the second hard layer is greater than an area of the second support member.

7. The flexible display device according to claim 1, wherein a compensation layer is further disposed on one side of the flexible display screen close to the first support member, and a thickness of the compensation layer is less than or equal to the thickness of the first hard layer.

8. The flexible display device according to claim 7, wherein the compensation layer is integrally formed with the flexible display screen.

9. The flexible display device according to claim 7, wherein one end of the compensation layer is adjacent to one end of the second hard layer, and when the second support member moves away from the first support member, the second support member moves with the flexible display screen to a position between the first support member and the flexible display screen.

10. The flexible display device according to claim 1, wherein a soft layer is further disposed between the flexible display screen and the second hard layer, and a projection of the second hard layer on the flexible display screen falls within a projection range of the soft layer on the flexible display screen.

11. The flexible display device according to claim 10, wherein a modulus of the soft layer is from 1 MPa to 10,000 MPa.

12. The flexible display device according to claim 10, wherein the soft layer comprises foam material.

13. The flexible display device according to claim 1, wherein a plurality of grooves are disposed at intervals in an upper surface of one of the first support member and the second support member, a plurality of comb teeth are disposed at intervals on the upper surface of the other of the first support member and the second support member, and each of the comb teeth is disposed corresponding to and embedded in each of the grooves.

14. The flexible display device according to claim 13, wherein a cross section of each of grooves is an inverted trapezoid, and a cross section of each of comb teeth is a trapezoid.

15. The flexible display device according to claim 14, wherein a height of a top surface of each of the comb teeth is less than or equal to a height of a top opening of each of the grooves.

16. The flexible display device according to claim 1, wherein the flexible display device further comprises a guide member disposed within the housing, and the second end of the flexible display screen bypasses the guide member and is connected to the winding mechanism.

17. The flexible display device according to claim 16, wherein the guide member is a roller, and a pair of circular protrusions are disposed on one of inner walls of two first lateral plates oppositely disposed in the housing and two end faces of the roller, a pair of circular grooves are disposed on the other of the inner walls of the two first lateral plates oppositely disposed in the housing and the two end faces of the roller, and the circular protrusions are embedded in the circular grooves.

18. The flexible display device according to claim 1, wherein a pair of slide grooves are disposed on inner walls of two first lateral plates oppositely disposed in the housing, and two sides of the second support member are movably disposed in the pair of the slide grooves.

19. The flexible display device according to claim 18, wherein a pair of slots are disposed on the inner walls of the two first lateral plates, and two sides of the first support member are fixedly disposed in the pair of the slots.

20. The flexible display device according to claim 1, wherein the winding mechanism comprises a first winding member, a second winding member, and a transmission component, the first winding member is fixed to the second support member, the transmission component is fixed to the housing, and the second winding member is movably disposed with the transmission component, wherein when the flexible display screen is in a first state, the transmission component controls the first winding member and the second winding member to slide in directions away from each other; and when the flexible display screen is in a second state, the transmission component controls the first winding member and the second winding member to slide in a direction approaching each other.

* * * * *